H. A. STILLWELL.
MACHINE FOR ASSEMBLING CAPS IN A HOLDER.
APPLICATION FILED JAN. 18, 1910.
992,922.
Patented May 23, 1911.
3 SHEETS—SHEET 3.
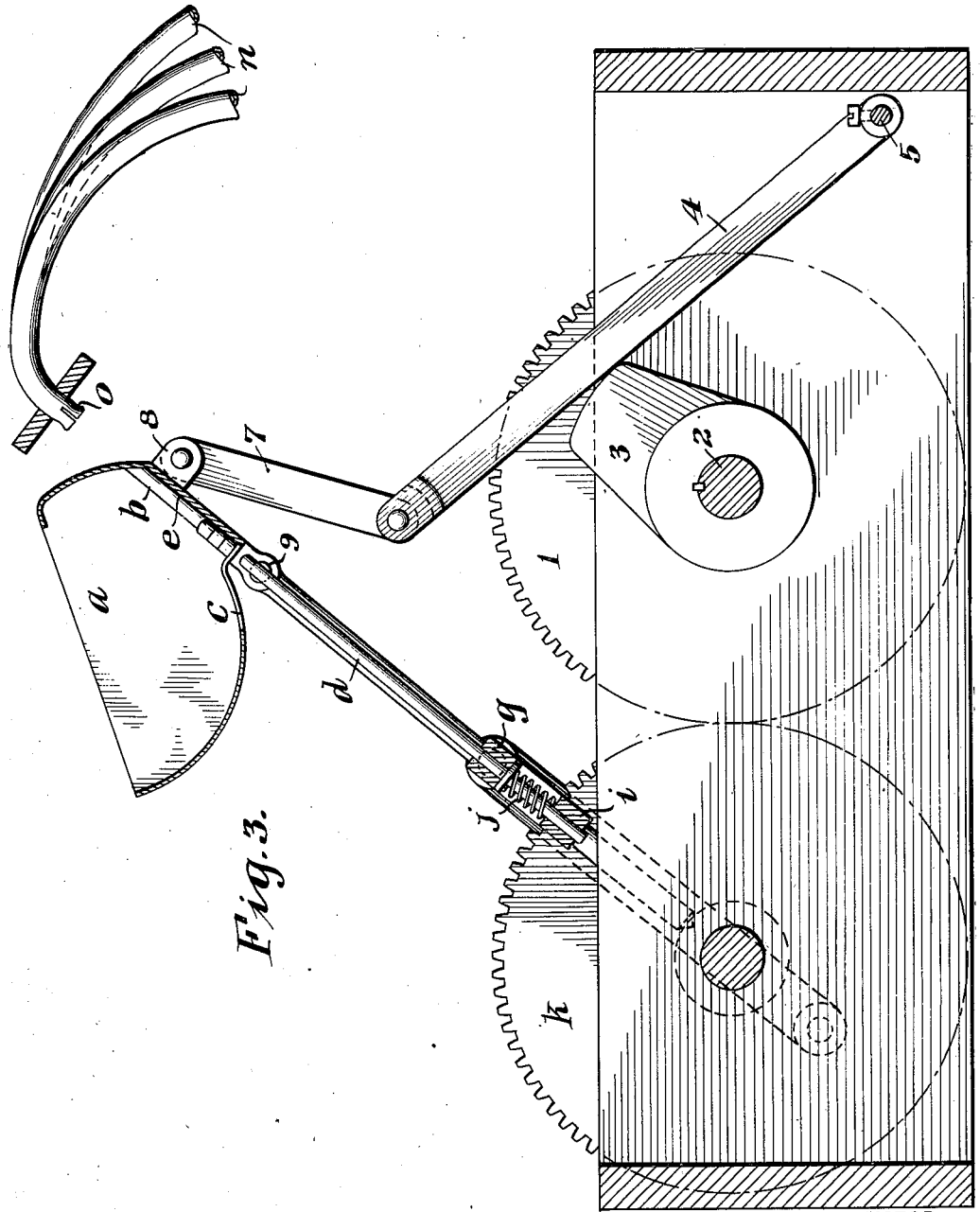
WITNESSES:
Daniel Webster, Jr.
E. E. Wall.
INVENTOR
Harard A Stillwell
BY
Hurlly Harding
ATTORNEYS

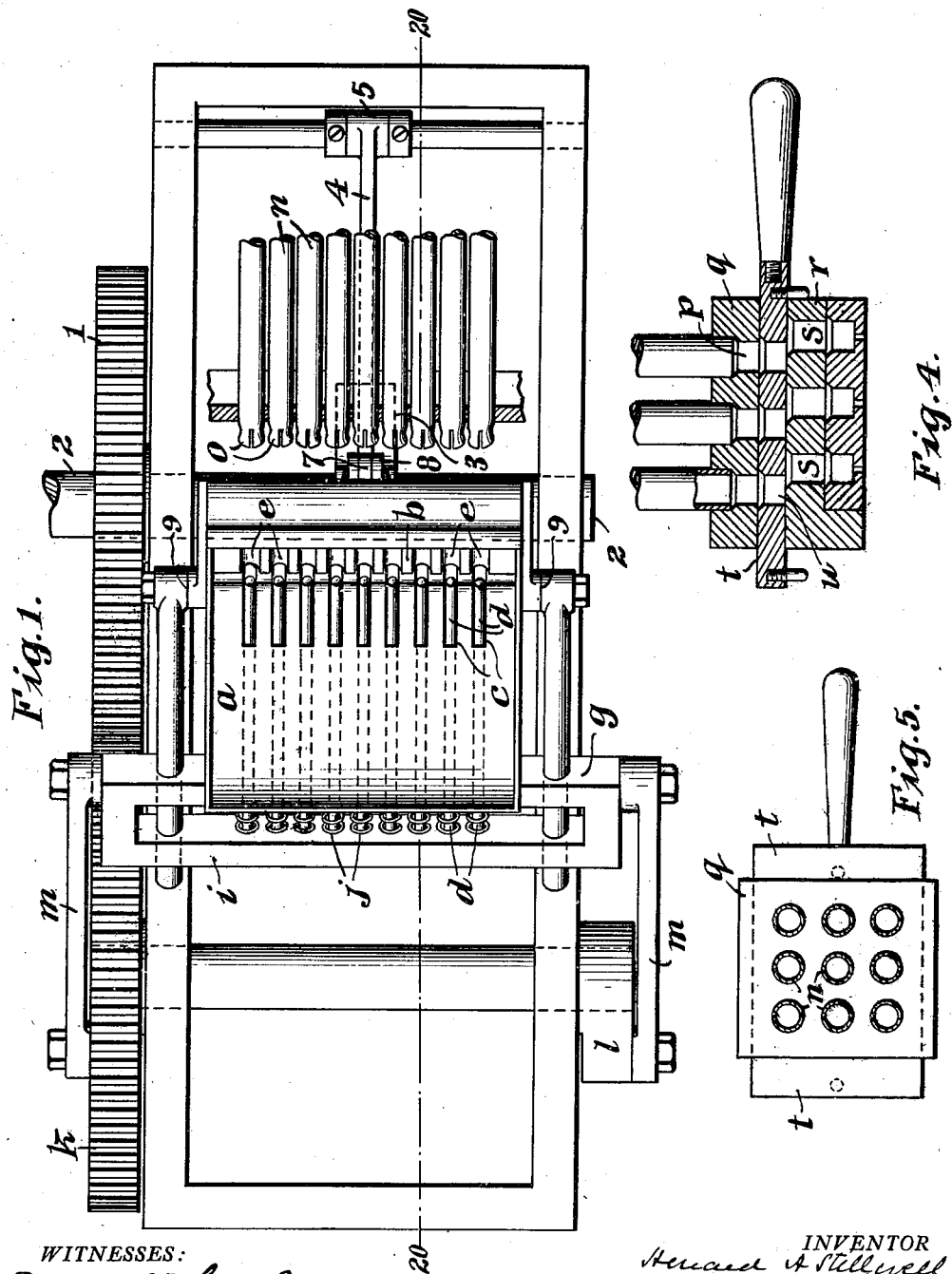

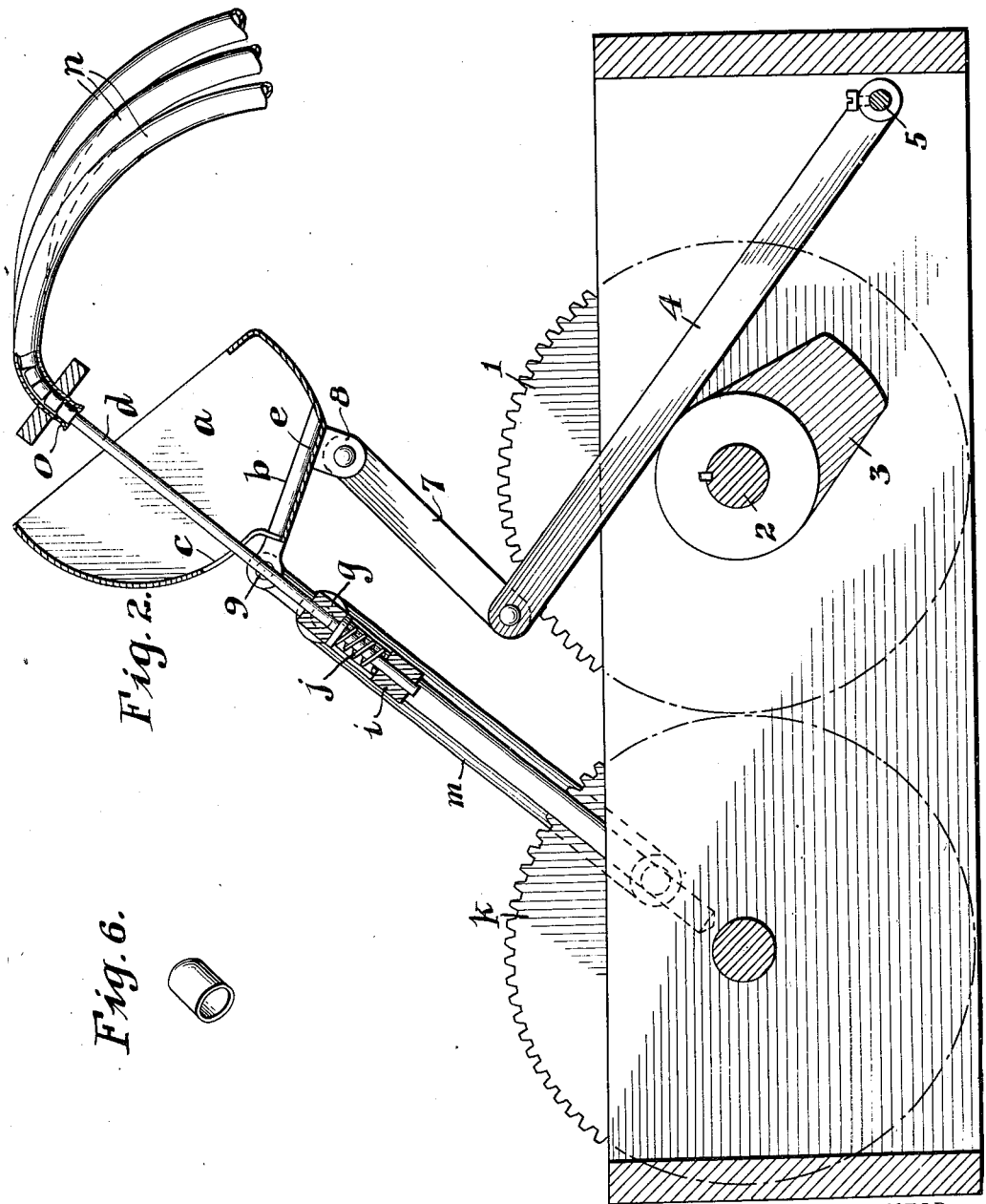

UNITED STATES PATENT OFFICE.

HOWARD A. STILLWELL, OF WOODBURY, NEW JERSEY, ASSIGNOR TO E. I. DU PONT DE NEMOURS POWDER COMPANY, OF WILMINGTON, DELAWARE, A CORPORATION OF NEW JERSEY.

MACHINE FOR ASSEMBLING CAPS IN A HOLDER.

992,922.  Specification of Letters Patent.  Patented May 23, 1911.

Application filed January 18, 1910. Serial No. 538,634.

*To all whom it may concern:*

Be it known that I, HOWARD A. STILLWELL, a citizen of the United States, residing at Woodbury, county of Gloucester, and State of New Jersey, have invented a new and useful Improvement in Machines for Assembling Caps in a Holder, of which the following is a full, clear, and exact description, reference being had to the accompanying drawings, which form a part of this specification.

My invention relates to a machine in which any desired number of caps are taken from a hopper and placed in a holder with the open end upward for the purpose of loading or charging. The caps are percussion or detonating caps for explosives.

Generally speaking, I use a hopper in which the caps are placed. The bottom of this hopper has grooved guides in which pins are adapted to move longitudinally. In the rear portion of this hopper are slots through which the pins may be withdrawn in their backward movement, the slots being of such width that the caps cannot fall therethrough. The pins are given a reciprocating longitudinal movement, and the hopper an oscillating movement. The pins in their movement in one direction pass into the guides and in the other direction pass out of the hopper through the slots. The hopper is oscillated so that the guides in the bottom of the hopper are in line with the pins when the pins are in their rear position and oscillated in the opposite or downward direction after the pins have entered the guides and moved forward about three quarters of an inch therein. Each of the pins registers with a tube placed in front of and outside of the hopper, and the pins in their forward movement enter such caps in each of the tubes as may have lain in the guides with their open ends toward the pin, and thus have been picked up on the end of the pin in its forward movement. The pin pushes it forward into the tube corresponding to the guide. This is successively carried on until the tube is filled. The inlet of the tube is slightly contracted to hold the cap at that point until a succeeding cap pushes it forward. The connection between the reciprocating mechanism and the pins is a yielding connection, so that when any given tube is filled, so long as it remains so filled, the yielding connection will yield in attempting to force additional caps therein.

The tubes terminate in orifices in a block, beneath which is a sliding orificed plate, the orifices of which are of a height equal to that of the cap. Beneath this plate is a second block which has orifices corresponding, but out of alinement with the orifices in the upper block. The orifices in the plate are first moved into alinement with the orifice in the block at the discharge end of the tubes, and the orifices in the plate being filled by the caps dropping from the tubes, the plate is moved so that the plate orifices aline with the orifices in the lower block. The cap holder is placed under the lower block.

I will now describe the embodiment of my invention illustrated in the accompanying drawings and then point out the invention in the claims.

In the drawings: Figure 1 is a plan view of my invention, the holding tubes being broken away. Figs. 2 and 3 are sections on the line 20—20 of Fig. 1 showing the respective positions of the various parts during operation. Fig. 4 is a vertical section through the delivery part of the apparatus. Fig. 5 is a plan view of the same and Fig. 6 is a perspective view of one of the caps.

$a$ is a hopper having in its forward end the strips $b$, forming guide ways $e$ between said strips, and in its rear end the slots $c$.

$d$ are pins which are given a longitudinal reciprocating movement. In their forward movement, each pin passes into a guide $e$ and in their rearward movement passes out through the slots $c$. These pins pass through orifices in a bar $g$, and through orifices in bar $i$.

$j$ are springs surrounding the fingers between bars $g$ and $i$.

$k$ is a gear wheel rotated by appropriate means, not shown.

$l$ is a crank operated by this gear, and $m$ is a link connecting the crank and bar $i$ by which means the bar $i$ is given a reciprocating movement. By means of the springs $j$ this movement is transmitted to bar $g$ and hence to pins $d$.

$n$ are tubes, each guideway $e$ being adapted to register with a tube $n$, and a pin $d$ when in the position shown in Fig. 3. The inlet end of these tubes are somewhat contracted, as shown at $o$, so that it requires some force to send a cap into the tube. The outlet ends of these tubes register with orifices $p$ in the block $q$.

$r$ is a block below block $q$, and having orifices corresponding to, but out of alinement with, the orifices $p$ in the block $q$. Interposed between the blocks $q$ and $r$ is the sliding plate $t$ which has orifices $u$ corresponding with the orifices $p$ and $s$. Beneath the lower block $r$ the cap holder may be placed to receive the caps.

The hopper is oscillated in the following manner: The gear wheel $k$ meshes with the gear wheel 1, on the shaft 2 on which is the cam roller 3. On this cam roller 3 rests the arm 4 pivoted at 5, which arm is connected by the link 7 with a projection 8 from the hopper. The hopper is pivoted at 9.

The operation is as follows: The caps are placed in the hopper. When the pins are in their rearward position, as shown in Fig. 3, the hopper is rocked forward, placing the caps in the guides $e$. In the forward movement of the pins as many of the pins as meet a cap presenting an open end to said pin, will catch a cap, carrying it forward to its corresponding tube. As the successive caps are carried into the tubes, the tubes will gradually fill up. The caps pass out of the tubes into the orifices in the block $q$. At this time the orifices in the sliding plate aline with the orifices in such block.

While in practice each pin will not at each reciprocation pick up a cap, still the average picking up is more than compensated by the capacity to continuously operate the machine and the avoidance of complicated mechanism.

The springs $j$ avoid the trouble which might otherwise occur if one or more tubes were not filled at the same time as the remainder. When a tube is filled, and until the plate is moved to carry off a cap to its orifice lower block, the resistance to the entry of further caps into such tube will cause the spring $j$ of that finger to yield so that it no longer acts to force the cap into the tube. As soon as the orifices in the sliding plate is filled, it is moved so that its orifices aline with the orifice in the lower block. Beneath this lower block is placed the shell holder. When the shell holder is filled, the sliding plate is moved back to its original position. When the pins move backward and are free from the grooves, the hopper is rocked backward to again bring the guides in alinement with the pins. The oscillating movement of the hopper not only agitates the caps but removes the forward side below the line of the pins in their forward movement so that same may enter the tubes.

As to the utility of the blocks, the upper orificed block forms an outlet for the tubes and maintains their alinement and position. The block below the plate is essential for the following reasons: The cap holder is not always in position and therefore without the lower block the caps would fall away. All the orifices in the upper block and plate are not simultaneously filled. With this arrangement, when the plate is moved to transfer caps to the lower block the mouths of the tubes are closed. Starting with the plate in position to receive caps, the orifices in the plate are first filled, the lower block preventing caps from passing away, then the plate is moved to make the orifices aline with orifices in the lower plate, at which time the mouths of the tubes are closed by the solid portion of the plate.

Having now fully described my invention, what I claim and desire to protect by Letters Patent is:

1. In a machine for assembling caps in a holder, in combination, a hopper, adapted to receive the caps, means to oscillate said hopper, pins, means to reciprocate said pins, whereby in one position of the holder the pins enter and pick up the caps whose open ends are in line of movement of said pins.

2. In a machine for assembling caps in a holder, in combination, a hopper adapted to receive the caps, said hopper having at one portion grooves, means to oscillate said hopper, pins corresponding to said grooves, means to reciprocate said pins, said pins being in line of movement of said grooves, whereby the caps having their open ends in line of movement of said pins are entered and moved by said pins.

3. In a machine for assembling caps in a holder, in combination, a hopper, adapted to receive the caps, means to oscillate said hopper, pins, means to reciprocate said pins whereby in one position of the holder the pins enter and pick up the caps whose open ends are in line of movement of said pins, and tubes into which the caps, the open ends of which are entered by the pins, are delivered.

4. In a machine for assembling caps in a holder, in combination, a hopper adapted to receive the caps, said hopper having at one portion grooves, means to oscillate said hopper, pins corresponding to said grooves, means to reciprocate said pins, said pins being in line of movement of said grooves, whereby the caps having their open ends in line of movement of said pins are entered and moved by said pins, and tubes into which the caps, the open ends of which are entered by the pins, are delivered.

5. In a machine for assembling caps in a holder, in combination, a hopper, adapted to receive the caps, means to oscillate said hopper, pins, means to reciprocate said pins, whereby in one position of the holder the pins enter and pick up the caps whose open ends are in line of movement of said pins, and tubes into which the caps, the open ends of which are entered by the pins, are delivered, a block having orifices registering with the outlets of said tubes.

6. In a machine for assembling caps in a holder, in combination, a hopper adapted to receive the caps, said hopper having at one portion grooves, means to oscillate said hopper, pins corresponding to said grooves, means to reciprocate said pins, said pins being in line of movement of said grooves, whereby the caps having their open ends in line of movement of said pins are entered and moved by said pins, and tubes into which the caps, the open ends of which are entered by the pins are delivered, a block having orifices registering with the outlets of said tubes.

7. In a machine for assembling caps in a holder, in combination, a hopper, tubes, means to transfer the caps from the hopper to the tubes, a block having orifices forming the outlets of the tubes, a second block below said first block and having orifices corresponding to, but out of alinement with, the orifices in the upper block, and an interposed orificed sliding plate between said blocks.

8. In a machine for assembling caps in a holder, in combination, a hopper, tubes, means to transfer the caps from the hopper to the tubes, a block having orifices forming the outlets of the tubes, a second block below said first block and having orifices corresponding to, but out of alinement with, the orifices in the upper block, an interposed orificed sliding plate between said blocks, the orifices in said plate in one position alining with the orifices in the upper block, and in another position with the orifices in the lower block.

9. In a machine for assembling caps in a holder, in combination, a hopper, tubes, means to transfer the caps from the hopper to the tubes, a block having orifices forming the outlets of the tubes, a second block below said first block, and having orifices corresponding to, but out of alinement with, the orifices in the upper block, and an interposed orificed sliding plate between said blocks, the orifices therein being in depth equal to the height of the cap.

10. In a machine for assembling caps in a holder, in combination, a hopper, tubes, means to transfer the caps from the hopper to the tubes, a block having orifices forming the outlets of the tubes, a second block below said first block and having orifices corresponding to, but out of alinement with, the orifices in the upper block, an interposed orificed sliding plate between said blocks, the orifices in said plate in one position alining with the orifices in the upper block, and in another position with the orifices in the lower block, said orifices therein being in depth equal to the height of the cap.

11. In a machine for assembling caps in a holder, in combination, a hopper, pins, tubes corresponding to said pins, yielding reciprocating means for said pins to transfer caps from the hopper to said tubes and a block at the outlet of said tubes having orifices to register therewith.

12. In a machine for assembling caps in a holder, in combination, a hopper, pins, tubes corresponding to said pins, yielding reciprocating means for said pins to transfer caps from the hopper to said tubes, a block at the outlet of said tubes having orifices to register therewith, a second block below said first block and having orifices corresponding to, but out of alinement with, the orifices in the upper block, and an interposed orificed sliding plate between said blocks.

13. In a machine for assembling caps in a holder, in combination, a hopper, pins, tubes corresponding to said pins, reciprocating means for said pins to transfer caps from the hopper to said tubes, a receiver adapted to coact with outlet end of said tubes, the inlet ends of said tubes being contracted.

14. In a machine for assembling caps in a holder, in combination, a hopper, pins, tubes corresponding to said pins, reciprocating means for said pins to transfer caps from the hopper to said tubes, a yielding connection between said pins and said reciprocating means and a block at the outlet of said tubes having orifices to register therewith.

15. In a machine for assembling caps in a holder, in combination, a hopper having grooves in one portion and slots in another portion, pins adapted to reciprocate through said slots and in said grooves, means to reciprocate said pins, means to oscillate said hopper to move the caps into the grooves and to allow the pins to enter and carry off the caps, and tubes to which said pins transfer said caps.

16. In a machine for assembling caps in a holder, in combination, a hopper having grooves in one portion and slots in another portion, pins adapted to reciprocate through said slots and in said grooves, means to reciprocate said pins, means to oscillate said hopper to move the caps into the grooves and to allow the pins to enter and carry off the caps, a tube corresponding to each groove to which said caps are transferred, and an orificed block at the outlet of the tubes.

17. In a machine for assembling caps in holders, in combination, tubes, a block having orifices registering with the outlets of said tubes, a second block below said first block having orifices corresponding, but out of alinement, with the orifices in the upper block, an interposed orificed sliding plate between said blocks, and means to deliver caps to said tubes.

In testimony of which invention, I have hereunto set my hand, at Woodbury, N. J., on this tenth day of January, 1910.

HOWARD A. STILLWELL.

Witnesses:
HOWARD K. WALLACE,
ERNEST REDFIELD.